United States Patent [19]
Dalrymple et al.

[11] Patent Number: 6,070,664
[45] Date of Patent: Jun. 6, 2000

[54] WELL TREATING FLUIDS AND METHODS

[75] Inventors: Eldon D. Dalrymple, Duncan, Okla.; Sanjay Vitthal, Lafayette, La.; Ronald G. Dusterhoft, Katy; Albert L. Wagner, Rosenberg, both of Tex.

[73] Assignee: Halliburton Energy Services

[21] Appl. No.: 09/022,423

[22] Filed: Feb. 12, 1998

[51] Int. Cl.⁷ ............................................ E21B 43/26
[52] U.S. Cl. .................................. 166/281; 166/308
[58] Field of Search .................................. 166/281, 295, 166/300, 308; 523/130

[56] References Cited

U.S. PATENT DOCUMENTS

| | | | |
|---|---|---|---|
| 3,881,552 | 5/1975 | Hessert | 166/281 |
| 4,460,627 | 7/1984 | Weaver et al. | 427/212 |
| 4,887,670 | 12/1989 | Lord et al. | 166/281 |
| 5,199,491 | 4/1993 | Kutta et al. | 166/281 |
| 5,358,047 | 10/1994 | Himes et al. | 166/281 |
| 5,595,245 | 1/1997 | Scott, III | 166/281 |
| 5,609,207 | 3/1997 | Dewprashad et al. | 166/281 |
| 5,775,425 | 7/1998 | Weaver et al. | 166/281 |

*Primary Examiner*—William Neuder
*Attorney, Agent, or Firm*—Robert A. Kent

[57] ABSTRACT

The present invention provides a method for reducing the amount of water produced from a subterranean formation as a result of stimulation of the subterranean formation. The method comprises the introduction of a first and second reactive polymer which leak-off into the formation and which are capable of subsequently reacting together to form a reaction product which selectively reduces the permeability of the formation to water flow through the formation. The reactive polymers react in situ to form a reaction product that binds to the formation in such a manner that the flow of water is selectively retarded through the matrix while the flow of oil is substantially unaffected.

15 Claims, No Drawings

WELL TREATING FLUIDS AND METHODS

BACKGROUND OF THE INVENTION

1. Field of the Invention

The present invention relates to an improved method for effecting water control during treating of subterranean zones in wells utilizing aqueous well treating fluids.

2. Description of the Prior Art

High viscosity aqueous crosslinked gels are used in a variety of operations and treatments carried out in subterranean zones or formations including, but not limited to, production stimulation treatments.

An example of a production stimulation treatment utilizing a high viscosity crosslinked gelled fluid is hydraulic fracturing. In hydraulic fracturing treatments, the high viscosity fluid is utilized as a fracturing fluid and also carries particulate propping agent, such as, sand, into the fractures formed. That is, the fracturing fluid is pumped through the wellbore into a formation to be stimulated at a rate and pressure such that fractures are formed and extended in the formation. Propping agent is suspended in the fracturing fluid so that it is deposited in the fractures when the gel is broken and returned to the surface. The propping agent functions to prevent the formed fractures from closing whereby conductive channels are formed through which produced fluids can flow to the wellbore.

Borate ion has long been used as a crosslinking agent for forming high viscosity crosslinked gelled well treating fluids. Various sources of borate ion have been utilized including boric acid, borax, sodium tetraborate and proprietary compositions comprised of boric acid and dimers and trimers of borate ions. Additionally, titanium, zirconium, aluminum, antimony ions and the like have been used as crosslinking agents to form high viscosity crosslinked gelled fluids.

A problem that often occurs during the performance of a stimulation treatment in an oil or gas producing zone which contains high permeability streaks which produce water or is subject to water influx is stimulation of the water producing zones concurrently with stimulation of the oil production. In such instances, water production from the formation may be excessive, requiring expensive separation and water disposal. Alternatively, after a stimulation treatment has been performed, a water control treatment may be attempted to reduce the production of water. The remedial treatments are expensive and are not always successful. The treatments can result in plugging of the formation and loss of production.

It would be desirable to provide a means by which a formation may be treated to selectively reduce the permeability of a subterranean formation to water flow while not damaging the ability of oil to flow through the formation to the producing well.

SUMMARY OF THE INVENTION

The present invention provides improved methods for reducing water production during stimulation treatments employing aqueous or gelled aqueous or crosslinked gelled aqueous well treating fluids.

In one embodiment, the stimulation treatment is initiated by the introduction of a treatment fluid into the wellbore at a rate and pressure slightly below or barely sufficient to fracture the formation. The treatment fluid is basically comprised of water, an optional hydrated galactomannan gelling agent, a first reactive polymer and a second reactive polymer capable of reacting in situ with said first reactive polymer to form a polycationic branched polymer and a pH adjusting agent capable of providing a pH in excess of about 9 to the fluid containing the reactive polymers. The treatment fluid then is followed with a gelled fluid at a rate and pressure sufficient to create fractures and to extend the created fractures into the subterranean formation and transport proppant into the fractures. In one preferred embodiment, the gelled fluid is basically comprised of water, a hydrated galactomannan gelling agent and any additional desired additives. The galactomannan gelling agent is present in the aqueous treating fluid in an amount in the range of from about 0.06% to about 0.72% by weight of water therein.

In another embodiment, the stimulation treatment is initiated by introduction of a treatment fluid that may include a hydrated galactomannan gelling agent into a formation at a rate and pressure sufficient to create at least one fracture in the subterranean formation. The initial fluid then is followed with a treatment fluid basically comprised of water, a first reactive polymer and a second reactive polymer capable of reacting in situ with said first reactive polymer to form a polycationic branched polymer and a pH adjusting agent capable of providing a pH in excess of about 9 to the fluid containing the reactive polymers. The reactive polymer containing treatment fluid is introduced at a rate and pressure sufficient to maintain the created fracture open but below that required to extend the initially created fracture or fractures. The treatment fluid is permitted to leak off through the fracture face into the formation at substantially matrix flow rates. After the desired volume of treatment fluid has been introduced into the subterranean formation, a conventional fracturing treatment including proppant placement may be performed.

In yet another embodiment, where a high permeability subterranean formation is to be treated, a stimulation treatment is initiated by introduction of limited quantity of a gelled or crosslinked gelled aqueous fluid to create at least one short fracture in the subterranean formation. The created fracture is permitted to at least partially close and a treatment fluid basically comprised of water, an optional hydrated galactomannon gelling agent, a first reactive polymer and a second reactive polymer capable of reacting in situ with said first reactive polymer to form a polycationic branched polymer and a pH adjusting agent capable of providing a pH in excess of about 9 to the fluid containing the reactive polymers. The treatment fluid is injected at a sequentially increasing rate whereby fluid is caused to flow into the fracture and initially leak off into the matrix near the wellbore and as the rate is increased the fluid will cause reopening and extension of the fracture and treatment fluid then will enter the formation matrix farther away from the wellbore. The final stages of the treatment fluid may include propping agents.

The methods of using the improved well treating fluids of this invention are basically comprised of the steps of preparing such treating fluids and then pumping the treating fluids into a subterranean zone or formation penetrated by a wellbore. The well then is shut-in for a sufficient period of time to permit the in situ polymerization to occur.

The shut-in time may vary from as little as several hours to over 24 hours. Preferably the wellbore is shut-in for at least about six hours and most preferably about 12 to 18 hours.

It is, therefore, a general object of the present invention to provide improved methods for reducing water production during stimulation treatments of subterranean formations.

Other and further objects, features and advantages of the present invention will be readily apparent to those skilled in the art upon a reading of the description of preferred embodiments which follows.

DESCRIPTION OF PREFERRED EMBODIMENTS

The aqueous well treating fluids of the present invention are simple to prepare and utilize a selected pH level to facilitate the formation of the in situ reaction product in the introduced fluid. Both the gelled treatment fluid and the crosslinked gelled treatment fluid are comprised of water and a hydrated galactomannan gelling agent along with selected other constituents.

The water utilized to form the well treating fluids of this invention can be fresh water, salt water, sea water, brine or any other aqueous liquid which does not adversely react with other components of the treating fluid. The water used in well treating fluids normally contains one or more salts for inhibiting the swelling of clays in the subterranean formations or zones being treated or to weight the treating fluid. The most common clay inhibiting salt utilized is potassium chloride, but other salts can also be used. The pH of the water is preferably in the range of from about 6.0 to about 8.5 to facilitate the hydration of the galactomannan gelling agent utilized.

The galactomannan gelling agents which can be used in accordance with the present invention are the naturally occurring gums and their derivatives such as guar, locust bean, tara, honey locust, tamarind, karaya, tragacanth, carrageenan and the like. These gums are generally characterized as containing a linear backbone consisting of mannose units having various amounts of galactose units attached thereto. The gums can also be characterized as having one or more functional groups such as cis-hydroxyl, hydroxyl, carboxyl, sulfate, sulfonate, amino or amide. Of the various galactomannan gelling agents which can be utilized, one or more gelling agents selected from the group of guar, hydroxyethylguar, hydroxypropylguar, carboxymethylguar, carboxymethylhydroxyethylguar and carboxymethylhydroxypropylguar are preferred. Of these, guar is the most preferred.

When one or more of the above mentioned glactomannan gelling agents are dissolved in water, the gelling agents are hydrated and a viscous aqueous gel is formed. In accordance with this invention, the galactomannan gelling agent or agents utilized are dissolved in the water in an amount in the range of from about 0.06% to about 0.72% by weight of the water, more preferably in an amount in the range of from about 0.12% to about 0.36%, most preferably about 0.30%.

The first reactive polymer comprises an alkyl acrylate polymer of the general formula:

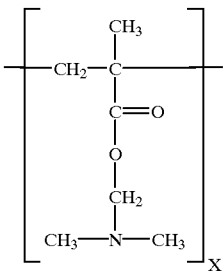

which is reacted in situ with a polyethylene oxide chain ($OCH_2 CH_2$) that can be capped or terminated by hydrogen, hydroxyl, $C_1$–$C_6$ oxyalkyl, $C_6$–$C_8$ oxyaryl, oxy (2 hydroxy-3-chloropropane) or Oxy (-2,3-oxypropane) and the like. Preferably, the polyethylene oxide chain is reacted with epichlorohydrin. The reaction of the two reactive polymers yields compounds of the general formula:

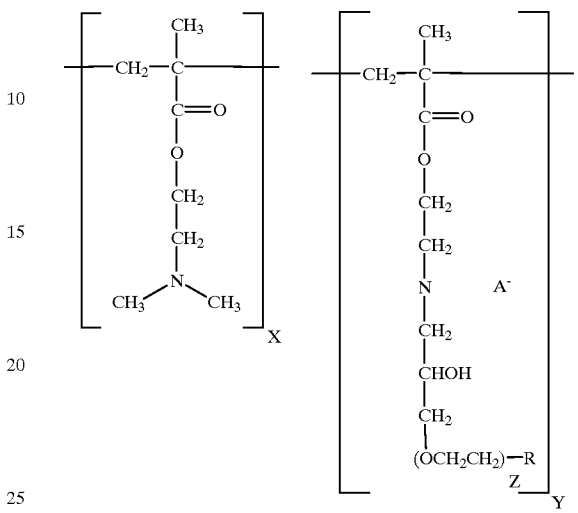

with X being from about 10 to 15,000; Y being from about 1 to 5,000 and Z being from about 2 to 10,000 and $A^-$ is an anion associated with the quaternary nitrogen, such as chlorine when an epichlorohydrin adduct is utilized. The ethylene oxide chain is capped with methyoxy for purposes of the illustration.

The first reactive polymer generally is admixed with the treatment fluid in an amount of from about ½ to about 10 percent by weight of the treatment fluid. The second reactive polymer comprising the polyethylene oxide compound is admixed with the treatment fluid in an amount of from about ½ to about 10 percent by weight of the treatment fluid. The admixture then is pumped into the wellbore and into the subterranean formation wherein it reacts in the rock matrix over time to form a branched polymer that tends to bond itself to the matrix as a result of its cationic nature.

The in situ reaction generally is effected at a formation temperature in excess of 75° F. and preferably in excess of about 100° F. The pH of the treatment fluid is adjusted to a level of above about 9 to facilitate rapid formation of the polycationic branched polymer by the addition of an alkaline agent such as caustic or the like.

Preferably the pH is adjusted to a level above about 9.5 and most preferably about 11–12.

In one embodiment, a stimulation treatment is initiated by the introduction of a treatment fluid basically comprised of water, an optional hydrated gelling agent, the first and second reactive polymers and a pH adjusting agent. The treatment fluid is injected at a rate slightly below or basically sufficient to initiate a fracture in the subterranean formation.

The treatment fluid is followed by a gelled treatment fluid to create and extend fractures into the subterranean formation from the wellbore. The treatment fluid is displaced by the gelled treatment fluid into the created fractures whereupon the reactive polymers leak off into the matrix of the formation and the in situ polymerization reaction is effected.

In an alternative embodiment, when a high permeability formation is to be treated, the first and second reactive polymers may be introduced into the subterranean formation following the introduction of a quantity of a gelled or crosslinked gelled aqueous fluid or as a part of the gelled or crosslinked fluid. In this instance, a quantity of the gelled or crosslinked fluid is introduced into the formation at a rate and pressure sufficient to create at least one fracture in the subterranean formation. The fracture is permitted to at least partially close, in one variation, and the first and second reactive polymers are introduced as a separate stage in an aqueous fluid. The aqueous fluid typically will include a quantity of a clay control additive such as potassium chloride or tetramethylammonium chloride or the like and a pH adjusting agent such as caustic or the like to raise the pH to a level of above about 9 and most preferably to 11–12. The reactive polymers are introduced at a sequentially increasing rate whereby fluid is caused to flow into the created fracture and initially leak off into the matrix along the fracture face. As the injection rate and pressure increase, the fracture will reopen and be extended. The treatment fluid will proceed to enter the matrix along the face of the extended fracture. The reactive polymers then may be followed with an additional quantity of the gelled fluid to displace the reactive polymers into the formation or by the crosslinked gelled fluid. The gelled fluid may include propping agents for placement in the created fracture.

The water and gelling agents of the crosslinked gelled fluid, when present, may be any of those previously described. Preferably the crosslinking agent comprises a borate composition which provides buffering to the treating fluid as well as crosslinking the hydrated galactomannan gelling agent in the treating fluid. Preferably the borate crosslinking composition is a liquid solution generally comprised of water, a soluble boron source such as boric acid and an alkanolamine or alkylamine. The water utilized in forming the borate composition is preferably fresh water, but other aqueous liquids can be utilized so long as they do not adversely react with or otherwise affect other components of the borate composition or the treating fluid formed therewith. The water can include one or more freezing point depressants such as ethylene glycol, propylene glycol, alcohols or the like to prevent the borate composition from freezing in cold weather. Preferably, ethylene glycol is combined with the water used in an amount of 50% by weight of the resulting solution which depresses the freezing point of the borate composition to less than about –20° F. The term "water" when used hereinbelow relating to the borate composition means water or other suitable aqueous liquid with or without one or more freezing point depressants dissolved therein. The water is preferably present in the borate composition in an amount in the range of from about 96% to about 5% by weight of the composition, most preferably about 60%.

The boron source can comprise substantially any boron containing compound capable of yielding borate in a solution maintained at a pH above about 7. The boron source can be provided by, for example, boric acid, boric oxide, pyroboric acid, metaboric acid, borax, sodium tetraborate and the like. For simplicity, reference will hereinafter be made to borate or boron content as boric acid or boric acid equivalents. That is, if a weight percentage is specified for boron content as boric acid, it is to be understood that a chemical equivalent amount of, for example, borax or sodium tetraborate could be substituted for the boric acid.

The boron source is preferably present in the crosslinking composition in an amount as boric acid in the range of from about 3% to about 82% by weight of the composition, most preferably in an amount of about 30%.

A variety of alkanolamines or alkylamines can be utilized in the borate crosslinking composition, but the quantity of boron in the composition is reduced as the molecular weight of the amine included in the composition increases. Thus, it is preferred that a relatively low molecular weight alkanolamine be used such as an ethanolamine. The most preferred low molecular weight alkanolamine is mono-ethanolamine. The use of a low molecular weight alkanolamine in the borate composition produces the further benefit of making the composition cold weather stable, i.e., the composition without a freezing point depressant therein does not crystallize or the like at low temperatures down to about 5° F. Other suitable alkanolamines include diethanolamine, 1-amino-2-propanol, 1-amino-2-butanol and the like. The alkylamines can comprise an aliphatic polyamine such as, for example, ethylenediamine, diethylenetriamine, triethylenetetraamine, 1,2-diaminopropane, tetraethylenepentamine and the like. The alkanolamine or alkylamine is generally present in the crosslinking and buffering composition in an amount in the range of from about 1% to about 13% by weight of the composition. When mono-ethanolamine is utilized, it is preferably present in the composition in an amount of about 10% by weight of the composition.

A particularly preferred highly concentrated, stable crosslinking composition useful in accordance with this invention is comprised of water present in an amount of about 60% by weight of the composition, boron calculated as boric acid present in an amount of about 30% by weight of the composition and mono-ethanolamine present in an amount of about 10% by weight of the composition. This composition is stable and is easily pumped and metered at low temperatures. The borate ion concentration in the composition is very high, and the composition has the ability to buffer the resulting treating fluid to a pH between about 8.4 and 9 without the need for any other chemicals such as caustic, sodium carbonate or other buffer.

The crosslinking composition comprised of water, a boron source and alkanolamine or alkylamine is present in the borate crosslinked gelled aqueous well treating fluids of this invention in an amount in the range of from about 0.05% to about 0.8% by weight of water in the treating fluids, preferably in an amount in the range of from about 0.15% to about 0.4%.

A particularly preferred borate crosslinked gelled aqueous well treating fluid is comprised of water, hydrated guar present in an amount of about 0.30% by weight of the water and the preferred borate composition for buffering the treating fluid and crosslinking the hydrated guar comprised of water, boric acid and mono-ethanolamine described above present in the treating fluid in an amount of about 0.2% by weight of the water.

In yet another embodiment, after at least one fracture has been created in a subterranean formation penetrated by a wellbore by introduction of a stimulation fluid, a treatment fluid including the reactive polymers is introduced into the created fracture. The treatment fluid is basically comprised of water, an optional hydrated galactomannan gelling agent, a first reactive polymer and a second reactive polymer capable of reacting in situ with said first reactive polymer to form a polycationic branched polymer and a pH adjusting agent capable of providing a pH in excess of about 9 to the fluid containing the reactive polymers. The treatment fluid is introduced at a rate and pressure such that the created fracture is maintained in an open condition but the rate and pressure are below that required to significantly extend the fracture. The treatment fluid is thereby permitted to leak off into the formation along the fracture face at substantially matrix flow rates. The reactive polymers then are permitted to react to form the branched polymer in the matrix of the subterranean formation to inhibit the subsequent flow of water from the formation to the wellbore.

As will be well understood by those skilled in the art, a variety of conventional additives can be included in the well treating fluids of this invention such as gel stabilizers, gel breakers, clay stabilizers, bactericides, fluid loss additives and the like which do not adversely react with the treating fluids or prevent their use in a desired manner.

The improved methods of the present invention for treating a subterranean zone penetrated by a wellbore are basically comprised of the steps of preparing an aqueous treating fluid containing a first and second reactive polymer and a gelled or crosslinked gelled aqueous treatment fluid and pumping the fluids into the subterranean formation. The wellbore then is shut-in for a period of at least several hours to permit the in situ reaction to occur. Preferably the wellbore is shut-in for at least about 6 hours and most preferably from about 12 to 18 hours. In such treatments, the gelled or crosslinked gelled well treating fluids pumped through the wellbore into the subterranean zone or formation may contain a propping agent, such as sand which is suspended in the gelled or crosslinked treating fluid and carried into any created fractures and deposited therein. Thereafter, during the shut-in period the gelled or crosslinked fluids are caused to break, i.e., revert to a thin fluid which can be reverse flowed out of the fractures leaving the proppant therein. Production of hydrocarbons then may be initiated from the treated subterranean formations.

In order to further illustrate the selective permeability reduction of the compositions of the present invention, the following example is provided.

EXAMPLE

The following laboratory flow studies were performed to evaluate the process of the present invention.

Sandstone core samples approximately 10 cm long and 2.38 cm in diameter were sealed into a sleeve having a fluid entry and exit port on opposite ends of the sleeve. A solution of Standard API Brine comprising 9% sodium chloride and 1% calcium chloride by weight is flowed through the cell at a flow rate of 2 to 5 ml/min with a back-pressure of about 100 psi until a relative initial water permeability is established.

Kerosene then is flowed through the core to establish an initial oil permeability. This sequence generally will be repeated three times to establish an average initial permeability. The core then is treated with a quantity of the first and second reactive polymers in a pH adjusted aqueous fluid. After the polymers have been permitted to react, brine and oil permeabilities are again determined by flowing either Standard API Brine or kerosene through the core until a constant permeability is established.

The results of the tests and the concentration of the reactive polymers, solution pH and relative change in permeability for the oil and water flows are set forth below in Table I.

TABLE I

| Sample No. | Temperature | pH | Concentration Reactive Polymers 1/2, WT. % | Retained Water | Permeability, % Oil |
| --- | --- | --- | --- | --- | --- |
| 1 | 140 | 12 | 2.5/2.5 | 83 | 192 |
| 2 | 140 | 12 | 2.5/2.5 | 78 | 233 |
| 3 | 140 | 12 | 5/5 | 40 | 100 |
| 4 | 110 | 9 | 6.25/6.25 | 31 | 84 |
| 5 | 200 | 12 | 5/5 | 31 | 58 |
| 6 | 214 | 11.5 | 5/5 | 6 | 27 |

The test results demonstrate the ability of the reactive polymers to selectively reduce core permeability to water flow while not preventing oil flow through the various core samples.

While numerous changes to the compositions and methods can be made by those skilled in the art, such changes are encompassed within the spirit of this invention as defined by the appended claims.

What is claimed is:

1. A method of reducing formation water production upon stimulation of a subterranean formation comprising:

introducing a solution of a first reactive polymer and a second reactive polymer capable of polymerizing with said first reactive polymer into said fracture in said formation and into the matrix of said formation, said solution of reactive polymers having a pH of at least about 9 by the addition of a pH adjusting agent;

introducing a gelled fluid comprising a hydrated galactomannan gelling agent and water into said formation at a rate and pressure sufficient to create a fracture and to extend said fracture in said formation; and shutting-in said well for a sufficient period of time to permit the first and second reactive polymers to polymerize in said formation whereby said reaction product selectively reduces the permeability of said subterranean formation to water.

2. The method of claim 1 wherein said well is shut-in for at least about 6 hours.

3. The method of claim 1 wherein said subterranean formation has a temperature above about 75° F.

4. The method of claim 1 where said first reactive polymer is an alkyl acrylate and said second reactive polymer is a polyethylene oxide chain.

5. The method of claim 1 wherein said first and second reactive polymer is introduced into said formation in admixture with at least a portion of said gelled fluid.

6. The method of claim 1 wherein the polymerization yields compounds of the general formula:

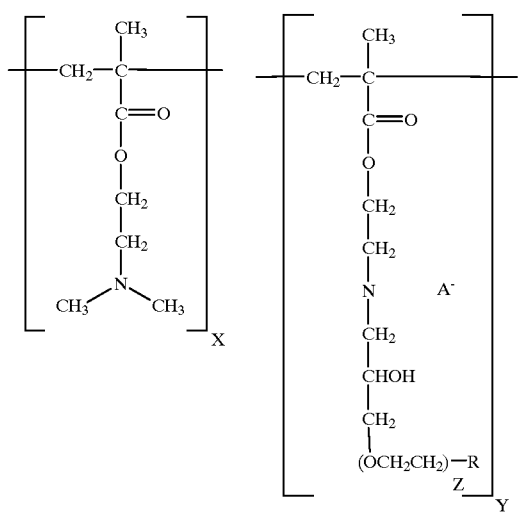

wherein X is from about 10 to 15,000, Y is from about 1 to 5,000, Z is from about 2 to 10,000, $A^-$ is an anion associated with the quaternary nitrogen and R is hydrogen, hydroxyl, $C_1$–$C_6$ oxyalkyl, $C_6$–$C_8$ oxyaryl, oxy (2 hydroxy-3-chloropropane) or oxy (-2,3-oxypropane).

7. The method of claim 6 wherein R is —$OCH_3$.

8. A method of reducing formation water production upon the stimulation of an oil-bearing subterranean formation penetrated by a wellbore comprising:

introducing a gelled fluid comprising a hydrated gelling agent and an aqueous fluid through said wellbore at a rate and pressure sufficient to create at least a fracture in said formation;

introducing a solution of a first reactive polymer and a second reactive polymer into said wellbore under conditions whereby said reactive polymers leak-off into the formation matrix along said created fracture, said solution of reactive polymers having a pH of at least about 9; and shutting-in said well for a sufficient period of time whereby at least a portion of said first and second reactive polymers polymerize in situ such that said polymerized reaction product selectively reduces the permeability of said subterranean formation to water.

9. The method of claim 8 wherein said solution of reactive polymers has a pH of at least about 11.

10. The method of claim 8 wherein said subterranean formation has a temperature above about 100° F.

11. The method of claim 8 wherein said first and second reactive polymer is introduced into said formation in admixture with at least a portion of said gelled fluid.

12. The method of claim 8 wherein said hydrated gelling agent is selected from the group consisting of guar, hydroxyethyl guar, hydroxypropyl guar, carboxymethyl guar, carboxymethylhydroxyethyl guar, carboxymethydroxy-propyl guar and mixtures thereof.

13. The method of claim 8 wherein the polymerization yields compounds of the general formula:

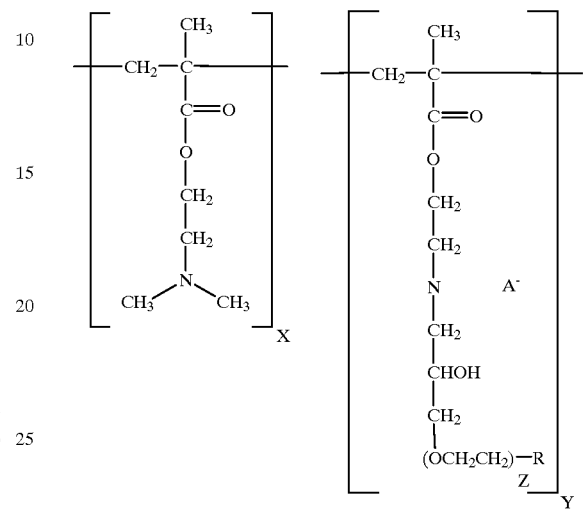

14. The method of claim 13 wherein R is —$OCH_3$.

15. A method of reducing the production of formation water upon stimulation of a hydrocarbon-bearing subterranean formation penetrated by wellbore comprising:

introducing a gelled or crosslinked gelled fluid comprising a hydrated gelling agent and an aqueous fluid into said formation through said wellbore at a rate and pressure sufficient to create at least one fracture in said formation;

permitting said created fracture to at least partially close;

introducing a first reactive polymer together with an a second reactive polymer into said formation at a sequentially increasing rate whereby said fracture is caused to be reopened and extended while permitting at least a portion of said polymers to leak-off into the formation matrix through the fracture face;

shutting-in said wellbore whereby said first reactive polymer and said second reactive polymer are permitted to react in situ within said formation to form a reaction product that selectively reduces the permeability of said formation to water flow therethrough; and producing hydrocarbons from said formation.

* * * * *